United States Patent [19]

Scheid et al.

[11] 4,409,482

[45] Oct. 11, 1983

[54] STABILIZATION CONTROL FOR A MASS SPECTROMETER

[75] Inventors: Peter Scheid, Göttingen; Heinrich Slama, Bovenden, both of Fed. Rep. of Germany

[73] Assignee: Max-Planck-Gesellschaft zur Foerderung der Wissenschaften e.V., Göettingen, Fed. Rep. of Germany

[21] Appl. No.: 251,863

[22] Filed: Apr. 7, 1981

[30] Foreign Application Priority Data

Apr. 11, 1980 [DE] Fed. Rep. of Germany ....... 3014053

[51] Int. Cl.³ ............................................. B01D 59/44

[52] U.S. Cl. .................................... 250/282; 250/299; 250/300

[58] Field of Search ............... 250/281, 282, 283, 299, 250/300

[56] References Cited

U.S. PATENT DOCUMENTS

| | | | |
|---|---|---|---|
| 2,613,324 | 10/1952 | Perkins et al. | 250/283 |
| 3,191,027 | 6/1965 | Field | 250/300 |
| 3,648,047 | 3/1972 | Bushman et al. | |
| 3,946,229 | 3/1976 | Moseman et al. | 250/300 |

FOREIGN PATENT DOCUMENTS 2037698 1/1977 Fed. Rep. of Germany .

OTHER PUBLICATIONS

"Adaptation of Respiratory Mass Spect. To Continuous Recording of Abundance Ratios of Stable Oxygen Isotopes", Schuster et al., *Recent Developments in Mass Spectrometry in Biochemistry and Medicine,* vol. 2, (1979), pp. 451–462.

*Primary Examiner*—Bruce C. Anderson
*Attorney, Agent, or Firm*—Kinzer, Plyer, Dorn & McEachran

[57] ABSTRACT

In a mass spectrometer, stabilization control is effected by modulating the unidirectional ion acceleration voltage with a low-amplitude constant-frequency modulation signal, preferably at the frequency of an A.C. source used to energize the instrument, producing an A.C. modulation component in the ion collector output; that modulation component of the output is detected to develop an error signal indicative of the direction of deviation of the acceleration voltage from an optimum condition of maximized output current and the error signal is employed to adjust the acceleration voltage to stabilize operation at the optimum condition. A corresponding control can be effected by modulation of the magnetic field that deflects the ion stream to impinge on the collector.

10 Claims, 3 Drawing Figures

STABILIZATION CONTROL FOR A MASS SPECTROMETER

BACKGROUND OF THE INVENTION

In a continuously measuring mass spectrometer a small sample of gas, or a gas mixture, is introduced into a vacuum chamber in which the gas is ionized and accelerated to form an ion stream. The ion stream then moves into a magnetic field; the magnitude of the magnetic field determines a characteristic path of motion for each ion as a function of its charge/mass ratio e/m. An ion collector, positioned in the path of motion, effectively measures the ion current and generates an output which is proportional to the concentration of the particular gas one is interested in, in the gas or mixture of gases being measured.

For a given ion concentration, a maximum current output is generated at the ion collector, and is maintained constant for a given length of time, only as long as the ion collector is located accurately in the correct path of motion of the ions. In any mass spectrometer, however, there are a number of factors that may cause effective drift in the required accurate alignment between the ion collector and the path of ion motion (the ion flight path). Thus, during operation an initial accurate adjustment of the instrument to produce a maximum signal, i.e. the stabilization of the peak output position, may be disturbed. Such drift may be occasioned by changes in the acceleration voltage or in the magnetic field; on the other hand, geometric parameters may also become changed as by expansion or contraction of parts of the instrument due to temperature changes.

West German patent publication No. 2134739 and U.S. Pat. No. 3,648,047 describe control arrangements for maintaining a relatively constant level of sensitivity for a mass spectrometer which may be changed by aging or by influences of the surroundings. In those arrangements, the outputs from a plurality of ion collectors, used for differing gas components, are summed up, and the resulting summation signal is compared with a reference signal. As a function of the result of the comparison, an error signal is generated; that error signal, which is used to change the degree of ionization or the number of the ions arriving at the collectors, is proportional to the deviation of the summation signal from the reference signal. A similar stabilization based on a summation or compound signal may be effected by controlling the gain of an amplifier in a circuit which follows the ion collectors, as is suggested in West German Pat. No. 2037698.

These stabilization methods assume the availability of several ion collectors in the mass spectrometer; moreover, they are usable only for the elimination of disturbances which influence all of the collectors in essentially the same manner. They react effectively with respect to those disturbances, such as the plugging of a capillary input, which influence the amplitudes of all of the collector signals, or of the peak signals, but will not necessarily re-align the system with respect to variations in the correct path of motion of the ions. Furthermore, they do not take into account that a given disturbance, such as a change of the acceleration voltage or a geometric variation due to a temperature change, may act differently upon the various collector signals. In particular, the operating peaks of the individual collectors, comprising the collector currents as functions of the acceleration voltage, may have different widths; thus, the current reductions caused by a given disturbance may be appreciably different at the individual collectors.

SUMMARY OF THE INVENTION

Thus, the problem to which the present invention is directed is the provision of a mass spectrometer control which provides an optimum adjustment or stabilization of the current of an individual ion collector at a maximum value which is determined by modification of the path of motion (flight) of the ions.

The changing of the path of the ions thus far has been used only for another purpose, namely for the measuring of different gas components or ion species in a mass spectrometer having only one collector.

Accordingly, the invention relates to an improved stabilization control for a mass spectrometer of the kind in which an ion stream traverses a predetermined path, under the influence of an acceleration voltage and a magnetic field, to impinge upon an ion collector which generates an output current proportional to the ion concentration in the stream, and including a control that varies the acceleration voltage or the magnetic field as a function of an error signal derived from the ion collector output. The improvement comprises modulation means for modulating the acceleration voltage or the magnetic field with an alternating modulation signal of constant frequency and amplitude, and error detection means, coupled to the ion collector, for generating the error signal based on the modulation signal component of the collector output. The error detection means comprises a phase detector having one input from the modulation means and a second input from the ion collector, and an averaging circuit coupled to the phase detector for generating an error signal indicative of the direction of variation of the acceleration voltage or the magnetic field from an optimum condition corresponding to maximum current output from the ion collector. whereby a maximum output current is maintained.

DESCRIPTION OF THE PREFERRED EMBODIMENTS

Figure 1:
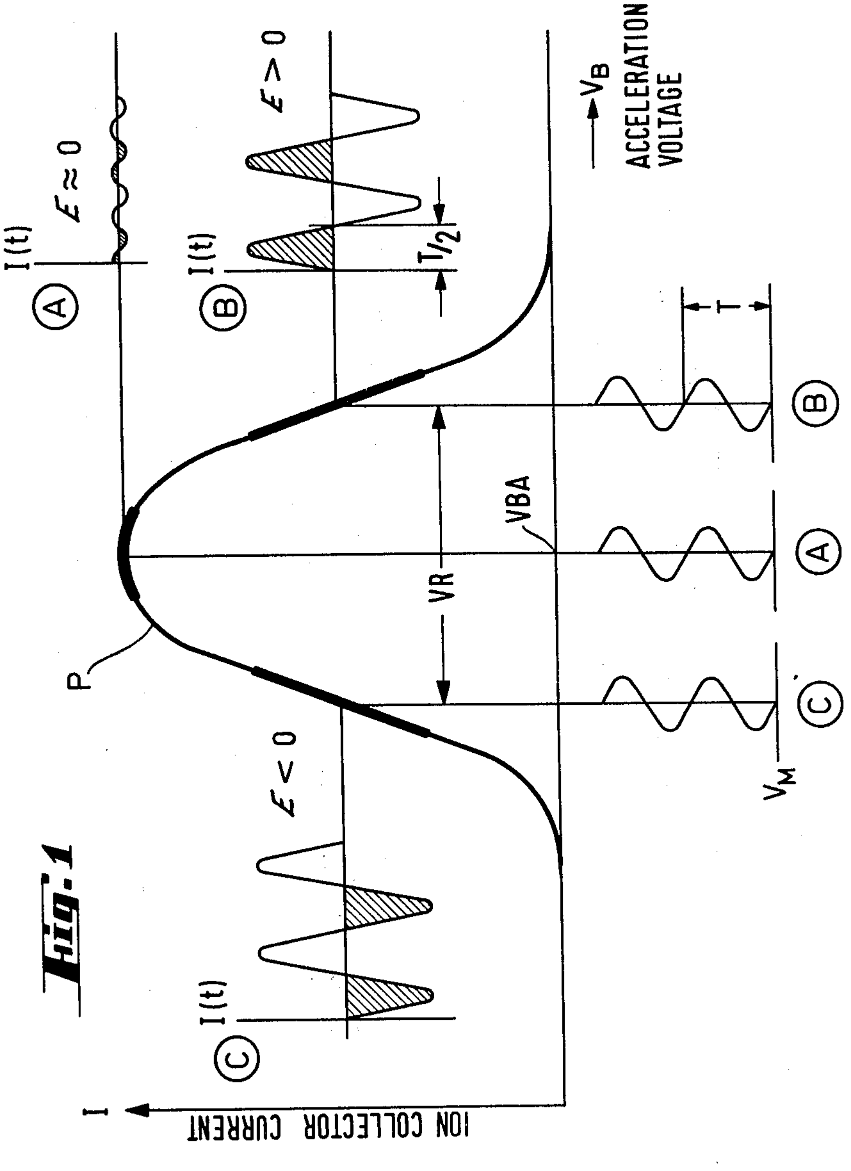
FIG. 1 is a graph of the current at an ion collector in a mass spectrometer, shown as a function of the acceleration voltage.

In FIG. 1, the curve P illustrates the ion current output I of an ion collector in a mass spectrometer, as a function of an acceleration voltage VB. Curve P shows that at a certain optimum voltage VBA there is a clearly defined maximum current, which can be stabilized; that is, changes in parameters which affect the path of motion of the ions toward the collector, such as the acceleration voltage, the magnetic field, and geometry, are minimized as regards their influence on the collector current. In order to accomplish this the acceleration voltage VB (the high voltage of the mass spectrometer) may be modulated with an alternating voltage having an amplitude which is preferably quite small with respect to the width of the curve P; in the example shown modulation is effected with a sinusoidal alternating voltage VM which has the frequency $f=1/T$. The ion current, which reaches the collector as a function of the acceleration voltage VB, becomes subjected to corresponding changes. Instead of doing this one also may periodically modulate the magnetic field of the mass spectrometer, in those instances in which the magnetic field is generated by electromagnetic means.

The case (A) in FIG. 1 shows the optimum peak alignment. In this case the modulation of the acceleration voltage VB by the sinusoidal alternating voltage VM at the frequency f causes the ion current I(t) of the collector to fluctuate with a small amplitude at the double frequency 2f around its mean maximum value.

In case (B), however the collector does not receive the maximum ion current, the ion current has dropped substantially because the acceleration voltage is too high. This is, optimal alignment of the curve P, i.e., the stabilization at the peak position, is not attained. The same modulation voltage VM here leads to much greater periodic fluctuations of the ion current I(t), this time with the basic frequency f. The effect of the modulation VM is similar for a substantially reduced acceleration voltage, case (C); for case (C), however, the periodic signal, i.e. the alternating component of the ion current I(t), shows a phase shift of 180° with respect to the excessive acceleration voltage example, case (B). The regions of current changes have been indicated in the curve P by a heavier line for easier recognition.

It is now possible to generate an error signal E by using a phase-sensitive detector, as by the integration of the alternating current portion of the ion current I(t) across the first half of the period (which in FIG. 1 has been rendered more distinct by cross-hatching) with respect to the phase of the modulation voltage VM. This error signal $$E = \int_{0}^{T/2} I(t)dt,$$

in a closed control circuit, may be employed to change the acceleration voltage VB so that E becomes approximately zero because, due to the double frequency of the alternating signal for the optimum case (A), the positive and negative portions thereof will cancel each other during the integration interval T/2. The value for the acceleration voltage VB will satisfy the conditions for optimal peak alignment when E is approximately zero.

The amplitude of the modulation voltage VM should be quite small with respect to the acceleration voltage range VR of the ion current peak curve P; this is the range of the accelerating voltage VB for which the ion collector will develop fifty percent or more of the maximum ion current. If this limitation is not observed, trouble may possibly arise in the control. Furthermore, a modulation voltage VM of excessive amplitude may cause difficulty in the removal thereof, by filtering, from the desired measuring signal. An amplitude for the modulation voltage VM of the order of ten percent of the acceleration voltage range VR has been found quite satisfactory.

The frequency f of the modulation voltage VM should be higher than the upper cutoff frequency of the mass spectrometer. That is, the frequency f should be higher than the upper resolution frequency of the instrument, which is determined by the total response time of the instrument. On the other hand, an upper limit is dictated for the frequency f by the frequency response of the first amplifier which is connected to the ion collector. It has been observed that in actual operation the lower limit to be used for the frequency f is the power line frequency, usually 50 Hz or 60 Hz. If one selects this particular frequency one gains the advantage that no beats can occur due to superposition of the modulation frequency on the components of the main frequency.

As previously mentioned, the frequency of the alternating current component of the collector output signal at optimum alignment, case (A), is double that of the undesirable cases (B) and (C). Consequently, it is possible to generate the error signal E directly as a function of this distinctive criterion. However, an additional criterion ought to be employed to indicate the required change of direction of the acceleration voltage, because outside of the peak no signal is generated at the frequency f.

Figure 2:
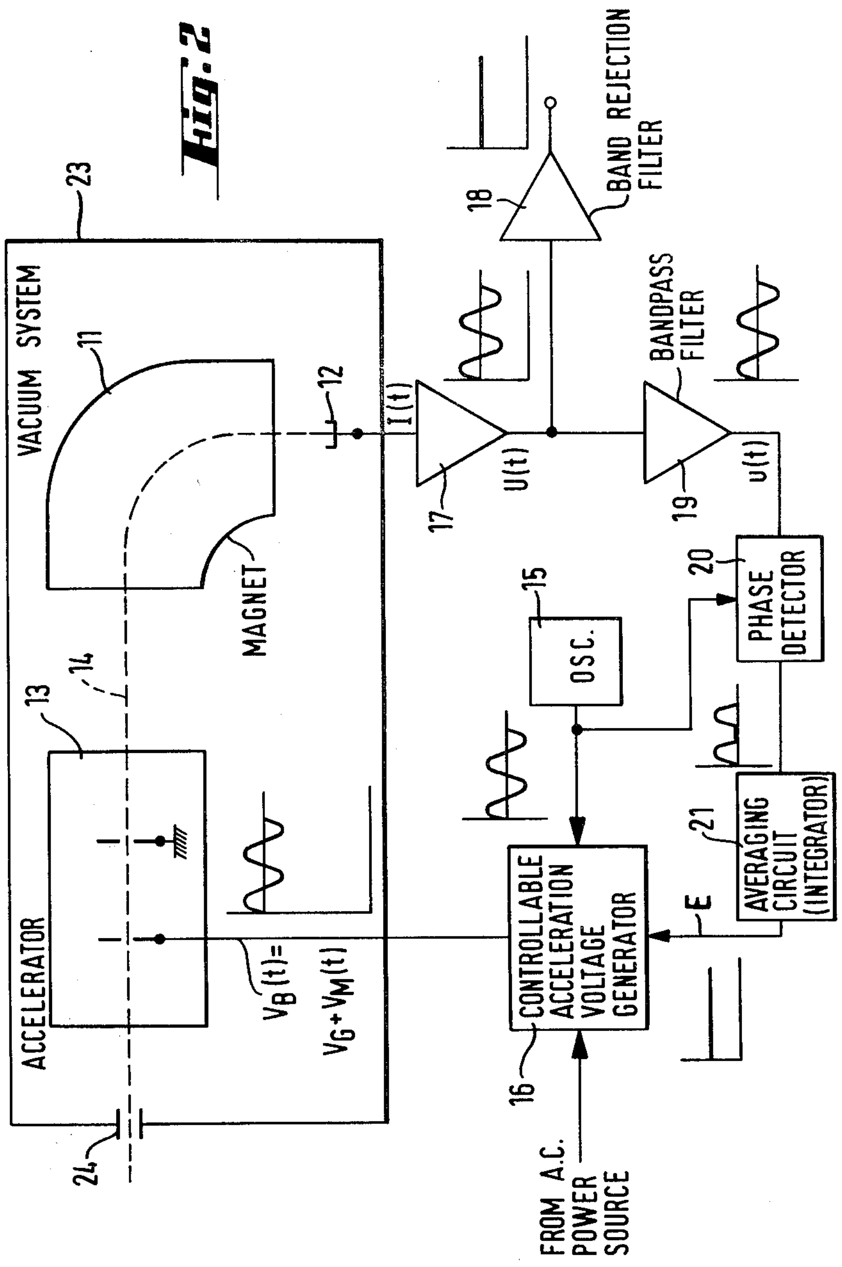
FIG. 2 is a block diagram of a preferred embodiment of a control circuit for stabilizing the peak current of a mass spectrometer and FIG. 3 is a detail block diagram of a modification of FIG. 2.

FIG. 2 is a block diagram of a preferred embodiment of the invention. It shows a continuously measuring mass spectrometer including a permanent magnet 11 mounted in a vacuum chamber 23. A stream of ions enters the chamber 23 through an inlet 24 and passes through an accelerator 13 which is energized by the acceleration voltage VB. This mass spectrometer has only a single ion collector 12. The configuration of the path of motion (flight path) 14 of the ions is determined by the acceleration voltage and by the strength of the electromagnetic field, being a function of the ratio e/m of charge to mass.

The acceleration voltage VB, generated by a controllable voltage generator 16, is controlled by the error signal E, which is the output from the averaging circuit 21, and is modulated by the sinusoidal modulation voltage, which is the output from the oscillator 15. The acceleration voltage VB thus comprises a direct component VG and sinusoidal alternating voltage VM of frequency F so that, referred to the amplitudes, one may write the equation $VB=VG+VM$. The modulation voltage may be generated by an oscillator 125, or it may be derived from an A.C. power source used to energize generator 16.

The ion stream is caught by the collector 12, which develops an output (ion current) I(t); due to the modulation of the acceleration voltage, this current includes a modulation component that varies with respect to time. The amplifier 17 transforms the current I(t) into a corresponding voltage signal U(t) which, after removal of the alternating modulation signal component by a suitable filter 18, is available as a measuring signal.

The voltage signal U(t) is also supplied to a bandpass filter 19 having the center of its pass band at the frequency f. Thus, the output of filter 19 corresponds to the modulation signal component u(t) of the signal U(t). In a phase detector 20, which is phase-coupled to the oscillator 15, the modulation signal component u(t), as this has been drawn, is limited to the first halfwave, that is the first half cycle for the oscillator 15. Next, an averaging or integrating circuit 21 transforms the output of the phase detector 20 into the error signal E, a direct voltage having an amplitude and a polarity which are functions of the amplitude and the phase, respectively, of the signal u(t). The averaging circuit 21 may be an integrator in the configuration of a low pass filter, preferably of the parallel resistance capacitance type known as a leakage integrator.

In the controlled voltage generator 16 the error signal E changes the direct voltage component VG of the acceleration voltage VB in such a direction that the error signal E converges toward zero.

For optimal initial alignment of the mass spectrometer the circuit from the integrator 21 to the voltage generator 16 may be interrupted and the acceleration voltage VB may be manually adjusted until the measuring signal at the output of the filter 18 is at a maximum and, simultaneously, the error signal E at the output of circuit 21 is zero.

The embodiment of FIG. 2 has been described for a mass spectrometer with a permanent magnet and a single ion collector, but it may be employed also in magnetic instruments which have several ion collectors and therefore will allow the simultaneous measuring of several kinds of ions. In this case the stabilizing of the peak preferably is done as the function of one collector of one specific ion having a high concentration that will not change greatly as time progresses. It is then possible to align the instrument to compensate for the peak instability factors which affect the different ion masses in the same way (e.g., fluctuations of the acceleration voltage and changes of geometry brought about by temperature variations). This can be accomplished with a greater accuracy than with the known method, cited above, based upon a summed-up signal from several ion collectors. The control can also be applied in those mass spectrometers which bring about a mass separation by use of quadrupoles.

The control described above in connection with FIG. 2 is especially advantageous if a scanning action is employed (as of the acceleration voltage or of the quadrupole field) so that several masses are determined quasisimultaneously, using a single ion collector connected in circuit with a multiplexer. In this manner, using a single control arrangement, one may stabilize the mass spectrometer individually for each mass, especially when the oscillator frequency f is substantially higher than the frequency at which the individual masses are scanned.

Another advantage is incurred if the arrangement disclosed here is employed for a mass spectrometer with a mechanically adjustable collector which, after an optimal adjustment for a first or reference mass may be readjusted for another mass. All one has to do then is to read out the error signal and to change the collector position until the error signal again becomes a minimum.

In the control of FIG. 2, the parameter modulated for stabilization and optimzation purposes is the acceleration voltage. For a mass spectrometer that includes an electromagnet instead of the permanent magnet 11, however, the same essential control can be applied, using modulation of the magnetic field instead of the acceleration voltage. The principal difference is that it is the current to the electromagnet that is modulated; the principle of control is the same.

Figure 3:
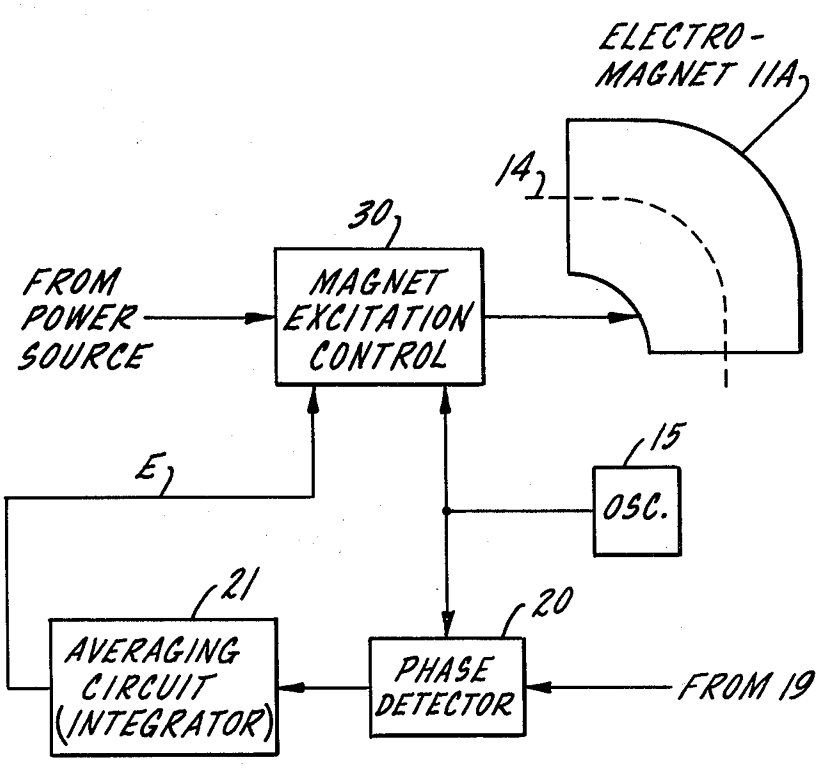

Thus, as shown in FIG. 3, an electromagnet 11A energized from a suitable power source through a magnetic excitation control 30 may be utilized in the mass spectrometer. To modulate the magnetic field, the oscillator 15 has its output connected to control 30. Phase detector 20 and integrator 21 are connected in the control as before, with the error signal E that is the output from integrator 21 being applied to excitation control 30 instead of to the acceleration voltage control as in the embodiment of FIG. 2. It is thus seen that the control arrangement is essentially the same as in FIG. 2 except that the modulation is applied to the magnetic field instead of to the acceleration voltage.

We claim:

1. An improved stabilization control for a mass spectrometer of the kind in which an ion stream traverses a predetermined path, under the influence of an acceleration voltage and a magnetic field, to impinge upon an ion collector which generates an output current proportional to the ion concentration in the stream, and including a control that varies the acceleration voltage or the magnetic field as a function of an error signal derived from the ion collector output, the improvement comprising:

modulation means for modulating the acceleration voltage or the magnetic field with an alternating modulation signal of constant frequency and amplitude;

and error detection means, coupled to the ion collector, for generating the error signal, based on the modulation signal component of the collector output, the error detection means comprising a phase detector having one input from the modulation means and a second input from the ion collector, and an averaging circuit coupled to the phase detector for generating an error signal indicative of the direction of variation of the acceleration voltage or the magnetic field from an optimum condition corresponding to maximum current output from the ion collector, whereby a maximum output current is maintained.

2. An improved stabilization control for a mass spectrometer, according to claim 1, in which the modulation means modulates the acceleration voltage with a modulation signal comprising an alternating voltage having an amplitude much smaller than the acceleration voltage range over which the output of the ion collector is equal to or exceeds fifty percent of the maximum current.

3. An improved stabilization control for a mass spectrometer, according to claim 1 or claim 2, in which the error detection means further comprises a filter for deriving the modulation signal component of the collector output, and in which the phase detector is connected between the filter and the averaging circuit.

4. An improved stabilization control for a mass spectrometer, according to claim 1, or claim 2, in which the modulation signal has a frequency equal to the frequency of an A.C. power source from which the acceleration voltage is derived.

5. An improved stabilization control for a mass spectrometer, according to claim 1 or claim 2, in which the modulation signal has a frequency equal to the frequency of an A.C. power source from which the acceleration voltage is derived.

6. The method of controlling the operation of a mass spectrometer in which an ion stream is accelerated by a unidirectional acceleration voltage and subsequently deflected by a magnetic field to impinge upon an ion collector that generates an output current proportional to the ion concentration in the stream, comprising the following steps:

A. modulating the acceleration voltage with a constant frequency modulation signal voltage having an amplitude smaller than the acceleration voltage range over which the output of the ion collector is equal to or exceeds fifty percent of the maximum current;

B. deriving a modulation signal component from the output of the ion collector;

C. detecting the phase of that modulation signal component to develop an error signal having a polarity indicative of the direction of variation of the acceleration voltage from an optimum condition corresponding to maximum current output from the ion collector;

D. and adjusting the acceleration voltage, in response to the error signal, to reduce the error signal to approximately zero and thereby stabilize operation at the optimum condition.

7. The method of controlling the operation of a mass spectrometer according to claim 6 in which, in step C, the modulation signal component is integrated to produce an error signal E of:

$$E = \int_{0}^{T/2} I(t)dt$$

in which

I(t) = modulation signal component

T = period of modulating signal.

8. The method of controlling the operation of a mass spectrometer according to claim 7 in which the amplitude of the modulation signal is of the order of ten percent of said acceleration voltage range.

9. The method of controlling the operation of a mass spectrometer according to claim 6, claim 7, or claim 8, in which the frequency of the modulation signal is equal to the frequency of an A.C. power source from which the acceleration voltage is derived.

10. The method of controlling the operation of a mass spectrometer in which an ion stream is accelerated by a unidirectional acceleration voltage and subsequently deflected by an electromagnetically generated magnetic field to impinge upon an ion collector that generates an output current proportional to the ion concentration in the stream, comprising the following steps:

A. modulating the magnetic field at a constant frequency with an amplitude low enough to preclude deflection of the ion stream completely outside of the confines of the ion collector;

B. deriving a modulation signal component from the output from the ion collector;

C. detecting the phase of that modulation signal component to develop an error signal indicative of the direction of variation of the acceleration voltage from an optimum condition corresponding to maximum current output from the ion collector;

D. and adjusting the magnetic field in response to the error signal, to reduce the error signal to approximately zero and thereby stabilize operation at the optimum condition.

* * * * *